G. VAFIADES AND J. KOUKOS.
FRUIT CUTTING AND CORING DEVICE.
APPLICATION FILED JUNE 27, 1921.
1,422,066.
Patented July 4, 1922.
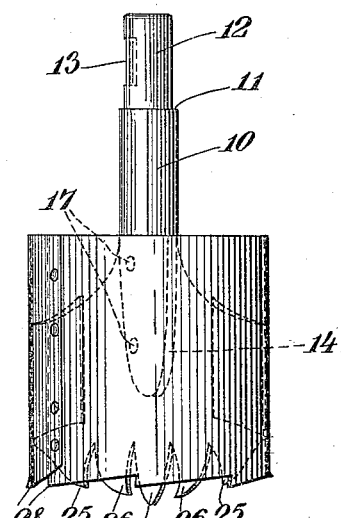
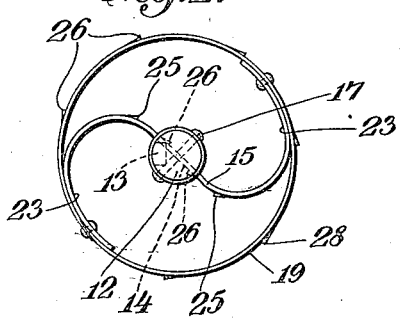
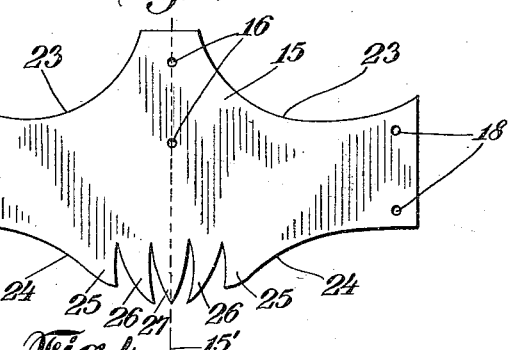
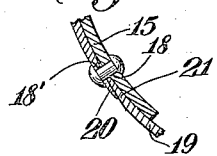
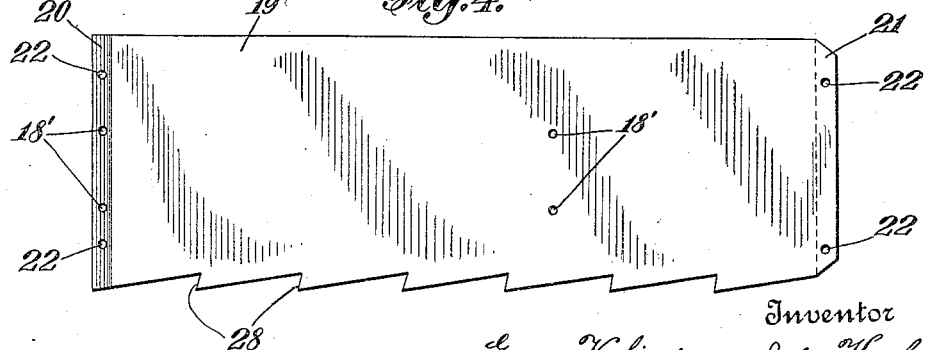
Inventor
George Vafiades and John Koukos
By their Attorney
Paul M Klein

UNITED STATES PATENT OFFICE.

GEORGE VAFIADES AND JOHN KOUKOS, OF NEW YORK, N. Y.

FRUIT CUTTING AND CORING DEVICE.

1,422,066. Specification of Letters Patent. Patented July 4, 1922.

Application filed June 27, 1921. Serial No. 480,637.

*To all whom it may concern:*

Be it known that we, GEORGE VAFIADES and JOHN KOUKOS, citizens of Greece, and residents of 302 Eighth Ave., New York city, in the county of New York and State of New York, have invented certain new and useful Improvements in Fruit Cutting and Coring Devices, of which the following is a specification.

This invention relates to fruit cutting and coring devices of the kind disclosed in our application, Serial No. 431,247, filed December 16th, 1920.

The present invention represents a modified form of the central cutting member of the device disclosed in the above mentioned application.

The object of our present invention is to provide an efficient coring device, adapted to not only unseed a fruit, for instance a grape fruit, but also to cut out the central uneatable webbing of the fruit.

A further object of our invention is to provide within such a device, outer and inner cutting members, the latter serving as a corer, the former performing the cutting operation of the webbing.

A further object of our invention is to provide means associated with the inner cutting or coring member, by way of which both blades of our device are revolved concentrically about their common longitudinal center axis.

The foregoing and other objects will be more fully apparent from the following description and the accompanying drawing, forming part of this specification, and in which:

Fig. 1 represents an elevation of our device.

Fig. 2 is a top view thereof.

Fig. 3 represents the inner cutting or coring member in its original form.

Fig. 4 represents the outer cutting member in its original form.

Fig. 5 is an enlarged detail view of the point of association of the inner and outer members.

Referring to the drawings, 10 represents a stem of the core holder, which is recessed as indicated at 11 and forms a reduced portion 12, which is provided with a cut-out flat face 13, against which a set screw may be thrust.

The lower portion of the stem is split as indicated at 14, to receive the central portion of the inner cutting or coring member 15, which is provided with apertures 16. Similar apertures are made in the split portion of the stem adapted to register with apertures 16, when blade 15 is inserted. Then rivets or other convenient means indicated at 17 are passed through the apertures for permanently fastening the inner blade to the stem.

The coring blade 15 is preferably made of flexible steel and is twisted in an S-shaped form as clearly seen in Fig. 2. The ends of the blade are provided with apertures 18, and similar apertures 18′ are provided in the outer cutting blade 19, the edges of which are tapered as indicated at 20 and 21.

In these beveled edges there are provided apertures 22 matching with each other when blade 19 is curved to a cylinder. Also blade 19 is preferably made of the flexible material.

The inner cutting or coring blade 15 receives a peculiar shape. The upper edge of this blade is cut out as seen at 23, symmetrical to the center axis of that blade, which passes through apertures 16 as indicated in dotted lines at 15′, leaving at this center portion sufficient space for engaging the lower part of stem 10. The lower edge of the blade is also curved, but in a downward direction, as shown at 24, also symmetrical to its center line.

At the lower center portion of the blade there is provided a plurality of cutting edges or teeth 25 and 26 and a central tooth 27, also symmetrically arranged and so disposed that the points of the teeth have the general direction and are progressing in size toward the center line 15′ of the blade.

The lower edge of blade 19 is also provided with a plurality of teeth indicated at 28, which teeth take the form of prolonged saw-teeth of equal length and size, pointing in one direction and disposed in substantially one plane.

When our device now is brought to its operating form, first the inner cutting or coring blade 15 is attached to the stem 10 at its cut out portion 14, as has been said previously. Then the outer blade 19 is formed to a cylinder and riveted together at the apertures 22, or otherwise fastened as for instance by the well-known spot-welding process. Then blade 15 is forced to its S- shaped form and brought into the now cylindrical form of blade 19, and the blades are then connected by passing rivets through the apertures 18 and 18′ of the inner and outer blades 15 and 19, respectively.

By twisting the blade 15 to its S-shaped form, the teeth 25, 26 and 27 remain disposed contrary to the direction of the twist of the blade, as indicated in Fig. 2. Similarly, the teeth or the cutting edges 28 of blade 19 point in outward direction from the circumferential form of the blade proper, as clearly seen in Fig. 2.

Through the peculiar shape of these blades, our device when in operation causes the cutting of the fruit about its core by means of the outer edges of the cutting blade 19, while the seeds are not only dismembered from the core but are brought upwards due to the twist of the teeth of blade 15.

As may be seen in the drawings, the stem 10 attached to the inner cutting or coring blade is centrally located at the common longitudinal center axis of both blades.

When our device is operated while held within the chuck or socket of a suitable machine, as that disclosed in our pending application Serial No. 431,247, it will revolve concentrically whereby only the center or webbing of a fruit subjected to the coring operation is cut by the peripheral teeth 28 of the outer blade 19, while the seeds of the fruit are torn from their places and brought upwards.

While we have shown a specific construction of our device and parts thereof, be it understood that changes may be made without departing from the broad scope of our invention. Thus the outer cutting blade 19 may be, for instance, manufactured from tubular stock, and the teeth cut in. The particular manner of attaching the parts together as shown in the drawing may be changed or improved in any desired way. Similarly the steps of assembling may be made in various other manners than explained.

We therefore reserve for ourselves the right to make such changes and improvements which may cheapen the process of manufacturing our invention, or in any other way benefit its operation.

What we claim is:—

1. A fruit corer, comprising outer and inner toothed coring members having cutting edges deflected beyond the contours of said members.

2. A fruit corer, comprising an outer and an inner coring member, cutting edges provided at the lower ends of the said members, and being deflected beyond the general contours of said members.

3. A fruit corer, comprising an outer toothed coring member, an inner coring member disposed transversely within the former and having a plurality of teeth which are twisted relatively to the contour of said inner member.

4. A fruit corer, comprising an outer toothed coring member adapted to cut peripherally, an inner coring member disposed transversely within said outer member and provided at its center portion with cutting edges twisted relatively to the contour of said inner member, the latter adapted to cut and scoop out the center portion of a fruit.

5. A fruit corer comprising a cylindrical outer cutting member having peripheral cutting edges, an inner twisted coring member having at its center portion a plurality of cutting edges, and means for facilitating said members to concentrically revolve about their common center axis.

6. A fruit corer comprising a cylindrical outer cutting member and a twisted inner coring member, and means for facilitating concentric revolution of said cutter and coring members about their common longitudinal center axis.

7. A fruit corer comprising a cylindrical outer cutting member having at its lower edge a plurality of cutting teeth, an inner twisted coring member arranged within said cutting member and having at the center portion of its lower edge a plurality of teeth symmetrically arranged and progressing in size toward the center axis of the corer, and means for facilitating concentric revolution of said members about their common center axis.

8. A fruit corer comprising a cylindrical outer cutting blade, having a plurality of saw-like teeth at its lower edge arranged substantially in a plane perpendicular to the longitudinal center axis of said cylindrical blade, a twisted inner blade arranged within said outer blade and having its lower edge symmetrically curved toward its center, a plurality of symmetrically disposed teeth formed at the center portion of said inner blade progressing in size toward the center axis of the blade, and means attached to the latter for facilitating concentric revolution of both blades about their common center axis.

Signed at New York in the county of New York and State of New York this 18th day of June A. D. 1921.

GEORGE VAFIADES.
JOHN KOUKOS.